Sept. 20, 1955

E. T. HARKLESS 2,718,622

ATTENUATION EQUALIZER

Filed March 16, 1953

2 Sheets-Sheet 1

INVENTOR
E. T. HARKLESS
BY
Ralph P. Holcomb
ATTORNEY

Sept. 20, 1955 E. T. HARKLESS 2,718,622

ATTENUATION EQUALIZER

Filed March 16, 1953 2 Sheets-Sheet 2

INVENTOR
E. T. HARKLESS
BY Ralph T. Holcomb
ATTORNEY

United States Patent Office 2,718,622

Patented Sept. 20, 1955

2,718,622

ATTENUATION EQUALIZER

Earl T. Harkless, Scotch Plains, N. J., assignor to Bell Telephone Laboratories, Incorporated, New York, N. Y., a corporation of New York Application March 16, 1953, Serial No. 342,347

22 Claims. (Cl. 333—28)

This invention relates to wave transmission networks and more particularly to adjustable attenuation equalizers.

The principal object of the invention is to provide a network whose attenuation can be adjusted to match any desired characteristic over a finite frequency range.

Other objects are to simplify the construction, reduce the cost, lower the flat loss, and improve the performance of such adjustable equalizers.

It is known that any attenuation characteristic may be matched over a limited frequency range by an infinite series of adjustable equalizers whose deviation characteristics correspond, respectively, to the terms of a Fourier series. In practice, it is found that a finite number of the lower terms of the series will usually suffice to provide an acceptable degree of simulation. Equalizers of this type are disclosed in Figs. 6 and 7 of United States Patent 2,348,572, issued May 9, 1944, to P. H. Richardson. The equalizer comprises a number of tandem-connected units having adjustable deviation characteristics which are harmonically related cosine curves. Each unit comprises a fixed series or shunt resistor to which is connected an all-pass shaping network terminated by an adjustable resistor. Each shaping network has an image impedance which is a constant resistance and a phase shift which is linear over the frequency range to be covered. A network having a linear phase shift over a broad band is difficult and expensive to build. Also, the equalizer will match a given distortion characteristic about equally well at all points in the band.

In some applications, such as television transmission systems, it may be desirable to provide better equalization in one frequency range than in another. The equalizer in accordance with the present invention is of the Richardson type but is so modified that the matching points are concentrated in the portion of the band where the best equalization is desired. This is accomplished by using a shaping network whose phase shift has a warped or non-linear, instead of a linear, frequency characteristic. More specifically, a phase characteristic which curves upward is used to improve the match at the higher frequencies, and one which curves downward is used to improve the equalization at the lower frequencies. Non-linear shaping networks, as compared with those of the linear type, have a decided advantage in simplicity and cost. A series of equalizer units in which the component shaping networks have integrally related, non-linear phase characteristics may be designed to provide a family of orthogonal transmission characteristics which may easily be adjusted by known techniques to simulate closely any given deviation curve.

The flat loss of the equalizer may be reduced by limiting the range of the higher harmonic cosine curves. The range is limited, without changing the image impedance of the shaping networks or the required range of the adjustable terminating resistors, by inserting a resistive pad between the shaping network and the fixed resistor. This permits the use of identical shaping networks in all of the equalizer units, thus reducing the cost.

The cost of the equalizer may be further reduced, and its construction simplified, by choosing for the shaping network a bridged-T, all-pass structure in which the parameter $b$, which determines the shape of the phase characteristic, has a value of two. Only two capacitors and two like inductors are required for this network.

The performance of the equalizer may be further improved by inserting a dissipation corrector between the shaping network and the fixed resistor to compensate for the dissipation in the component elements of the shaping network.

In the preferred embodiment of the invention, each unit of the equalizer comprises a series-type network and a shunt-type network of the above-described type formed into a bridged-T structure having at each end an image impedance which is a constant resistance throughout the band. Any number of such constant-resistance networks may be connected in tandem without requiring interposed isolating pads to prevent interaction between the units. Preferably, the image impedances of the shaping networks in both the bridging branch and the shunt branch of each unit are made equal to the image impedance of the equalizer as a whole. Since the shaping networks in the higher-harmonic units may be made up of an appropriate number of tandem-connected networks identical with those used in the first-harmonic unit, it follows that the same structure may be used for all of the shaping networks required for the equalizer. This is another important feature which contributes materially to simplifying the construction and reducing the cost of the equalizer.

The nature of the invention and its various objects, features, and advantages will appear more fully in the following detailed description of a preferred embodiment illustrated in the accompanying drawing, of which Fig. 1 is a schematic circuit of an adjustable, multi-unit, attenuation equalizer in accordance with the invention;

Figure 1:
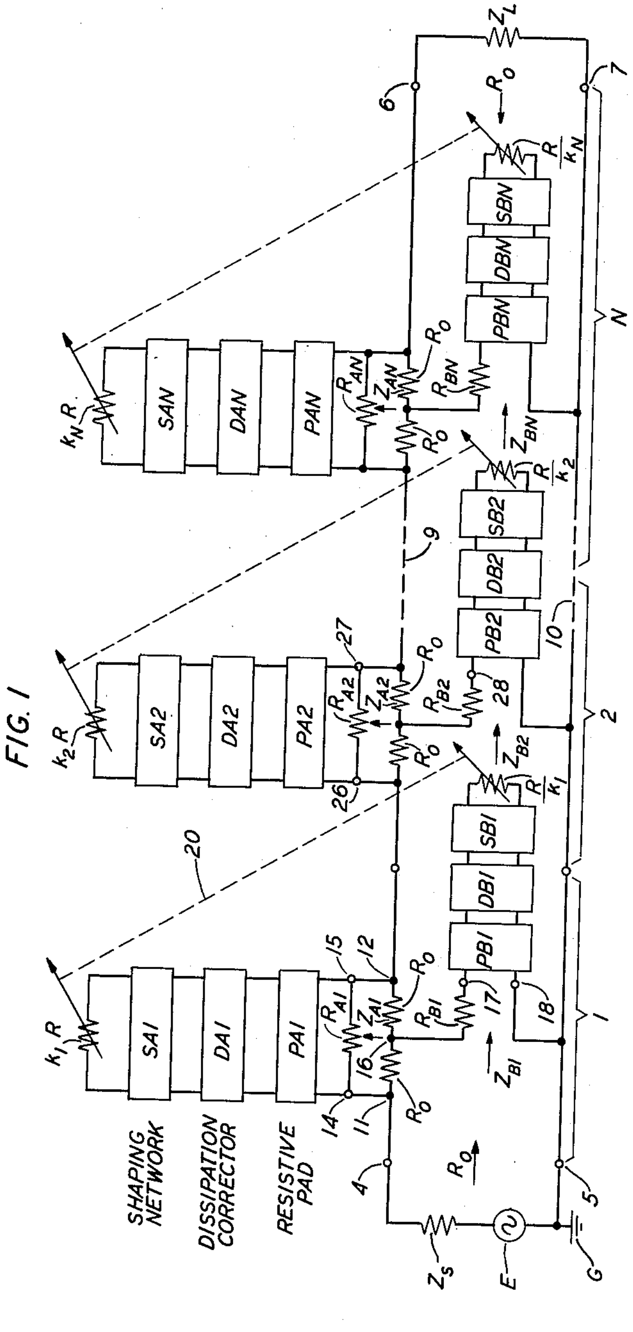

As shown in the preferred embodiment of Fig. 1, the attenuation equalizer in accordance with the invention comprises a number of individually adjustable units 1, 2, and N connected in tandem between a pair of input terminals 4, 5 and a pair of output terminals 6, 7. One side of the structure may be grounded, or otherwise fixed in potential, as indicated at G. A wave source of impedance $Z_S$ and voltage E is connected to the input terminals and a load impedance $Z_L$ to the output terminals. The equalizer has at each end an image impedance $R_O$ which is a substantially constant resistance throughout the operating frequency range. The impedances $Z_S$ and $Z_L$ are preferably each equal to $R_O$. It is to be understood that any number of similar additional units may be inserted, as indicated by the broken lines 9 and 10. The number of units required depends upon the closeness of equalization desired.

Each of the units 1, 2, and N is an unbalanced, constant-resistance, bridged-T structure comprising two series resistors each of value $R_O$, an interposed shunt branch of variable impedance, and a bridging branch of variable impedance. In the unit 1, the bridging impedance $Z_{A1}$ is constituted by a symmetry resistor $R_{A1}$, a resistive pad PA1, a dissipation corrector DA1, and a shaping network SA1 terminated in an adjustable resistor of value $k_1R$. The resistor $R_{A1}$ is connected to the outer terminals 11, 12 of the series resistors $R_O$, $R_O$. The networks PA1, DA1, and SA1 are connected in tandem, with the input terminals 14, 15 of the pad PA1 connected to the resistor RA1. The shunt impedance $Z_{B1}$ of the unit 1 comprises a second symmetry resistor of value $R_{B1}$, a resistor pad PB1, a dissipation corrector DB1, and a shaping network SB1 terminated in an adjustable resistor of value $R/k_1$. The networks PB1, DB1, and SB1 are connected in tandem and the resistor RB1 is connected between the common terminal 16 of the series resistors $R_O$, $R_O$ and an input terminal 17 of the pad PB1. The other input terminal 18 of the pad PB1 is connected to the low potential or grounded side of the equalizer. The networks SA1 and DA1 in the bridging branch are identical, respectively, with the networks SB1 and DB1 in the shunt branch.

In the units 2 and N, the bridging impedances $Z_{A2}$ and $Z_{AN}$ are similar in construction to the impedance $Z_{A1}$ of the first unit, and the shunt impedances $Z_{B2}$ and $Z_{BN}$ are similar to $Z_{B1}$. The component elements constituting the impedance $Z_{A2}$ in the unit 2 are designated $R_{A2}$, PA2, DA2, SA2, and $k_2R$, and those comprising $Z_{B2}$ are $R_{B2}$, PB2, DB2, SB2, and $R/k_2$. Similarly, in the unit N, $Z_{AN}$ is made up of the elements $R_{AN}$, PAN, DAN, SAN, and $k_NR$, and $Z_{BN}$ comprises the components $R_{BN}$, PBN, DBN, SBN, and $R/k_N$.

Returning to the unit 1, each of the networks SA1, SB1, DA1, and DB1 has, at each end, an image impedance which is a substantially constant resistance equal to R throughout the band to be equalized, which will be assumed to extend from zero to the frequency $f_1$. The shaping network SA1 is an all-pass structure. If it is to furnish the first-harmonic term of a cosine-type series, its phase shift will rise from zero to a value of 90 degrees over the frequency range from zero to $f_1$. If the phase shift is linear with the frequency $f$, the equalization characteristic obtained will be a substantially true cosine curve. However, in accordance with the present invention, the phase shift is made non-linear, thus providing a warped cosine characteristic which results in a weighting of the matching points over some selected portion of the band. The shape of the phase characteristic depends upon the choice of a design parameter $b$. If $b$ is equal to 1.2, the phase is substantially linear with frequency from zero to the 90-degree point. For larger values of $b$, the phase characteristic curves upward and the higher frequencies are weighted. Smaller values of $b$ give a phase characteristic which curves downward, with a resultant weighting of the lower frequencies.

Figure 2:
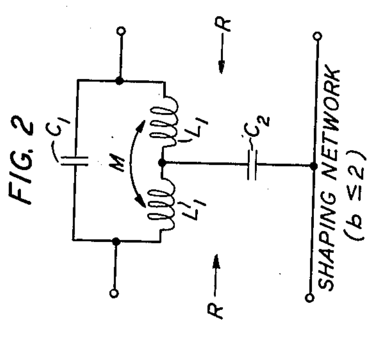
Figs. 2 and 3 are schematic circuits of all-pass, bridged-T networks suitable for use as the shaping networks such as SA1 and SB1 shown in Fig. 1.
Figure 8:
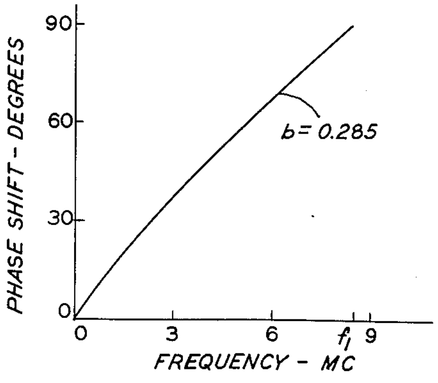

Fig. 2 shows an unbalanced, bridged-T, shaping-network circuit suitable for obtaining values of $b$ equal to two or less. The circuit comprises two series inductors each of value $L_1$ coupled by the mutual inductance M, an interposed shunt capacitor of value $C_2$, and a bridging capacitor of value $C_1$. When $b$ is two, M will be zero and the other elements will have the following values:

$$C_1=1/4\pi f_cR \qquad (1)$$

$$C_2=4C_1 \qquad (2)$$

and $$L_1=R/2\pi f_c \qquad (3)$$

where $f_c$ is the frequency at which the phase shift is 180 degrees. This is a preferred shaping-network circuit because it requires only four component elements and no coupling between coils. For values of $b$ less than two, mutual inductance M in the series-aiding sense must be provided. Fig. 8 shows the resulting phase characteristic obtained when the parameter $b$ is equal to 0.285 and the 90-degree point, or upper band limit, is placed at a frequency $f_1$ of 8.35 megacycles. The characteristic curves downward, which means that the lower frequencies are weighted.

Figure 3:
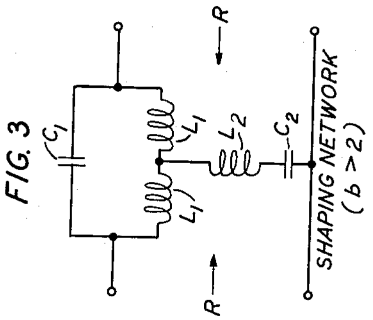
Figure 7:
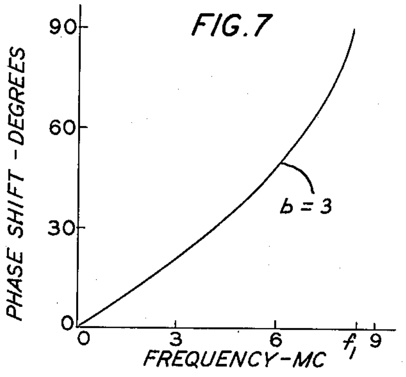
Figs. 7 and 8 show phase-frequency characteristics obtainable with the all-pass shaping network of Fig. 2 when the parameter $b$ has the values of three and 0.285, respectively.

Fig. 3 shows an unbalanced, bridged-T, shaping-network circuit suitable for obtaining values of $b$ greater than two. The circuit is similar to the one shown in Fig. 2 except that no mutual inductance is required and an inductor $L_2$ is added in series in the shunt branch. Fig. 7 shows the phase characteristic corresponding to a $b$ of three. The curve is concave upward, which means that the higher frequencies are weighted.

Figure 5:
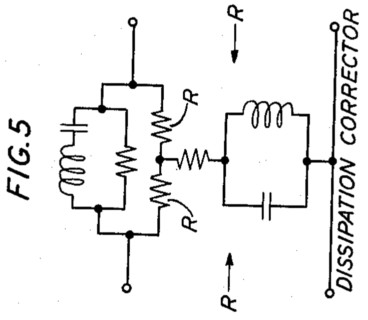
Fig. 5 is a schematic circuit of a constant-resistance, bridged-T equalizer suitable for use as the dissipation correctors such as DA1 and DB1 in Fig. 1.

The function of the dissipation corrector DA1 is to compensate for the dissipation in the component elements of the shaping network SA1. Fig. 5 shows a suitable circuit in the form of an unbalanced, bridged-T, constant-resistance structure of the type disclosed in United States Patent 1,606,817, issued November 16, 1926, to G. H. Stevenson. The network comprises two series resistors each of value R, and an interposed shunt branch and a bridging branch the component elements of which are selected to provide the desired attenuation equalization.

In the unit 1 of Fig. 1, the bridging impedance $Z_{A1}$ and the shunt impedance $Z_{B1}$ have the relationship $$Z_{A1}Z_{B1}=R_O^2 \qquad (4)$$

The shaping network SB1 and the dissipation corrector DB1 in the shunt branch may have circuits similar, respectively, to those of the corresponding networks SA1 and DA1 in the bridging branch. If the image impedance R of the networks SA1 and DA1 is chosen equal to $R_O$, the networks SB1 and DB1 may be identical with SA1 and DA1.

In order to make the insertion loss of the unit 1 symmetrical about the flat loss, the bridging resistor $SR_{A1}$ will have the value $$R_{A1}=1.62R_O \qquad (5)$$

The value of the shunt resistor $R_{B1}$ is given by $$R_{B1}=R_O^2/R_{A1} \qquad (6)$$

Thus, if $R_O$ is 75 ohms, $R_{A1}$ will be 121.3 ohms and $R_{B1}$ will be 46.3 ohms.

At every setting, the product of the adjustable terminating resistors $k_1R$ and $R/k_1$ is equal to $R^2$. Therefore, the one is adjusted from minimum to maximum as the other is adjusted from maximum to minimum. They are preferably dual resistors, with a unitary control as indicated by the broken line 20. The flat loss, obtained when each of these resistors is set at a value of R, is approximately equal to 4.18 decibels.

If each of the resistors $k_1R$ and $R/k_1$ covers the range from zero to infinity, the maximum adjustment range of the unit 1, with the pads PA1 and PB1 omitted, is approximately 4.08 decibels above or below the flat loss. It is usually found desirable to provide this maximum range for the first-harmonic term. Therefore, these pads are ordinarily omitted in this unit. However, it has been found from analysis and in practice that this maximum range is not ordinarily required for some of the higher harmonic terms. By restricting the range of these units, their flat losses may be reduced. In this way, the over-all loss of the equalizer, which is the sum of the flat losses of all of the component units, may be reduced. By employing impedance-transforming resistive pads such as PA2 and PB2 in the unit 2, the range may be reduced without changing the impedance level of the shaping networks and the dissipation correctors in the bridging branch and the shunt branch. This permits the use of two tandem-connected shaping networks, each identical with the network SA1, for the shaping network SA2, and also for the network SB2 in the unit 2. Also, the dual resistors $k_2$R and $R/k_2$ may have the same range as the resistors $k_1$R and $R/k_1$ used in the unit 1.

Figure 4:
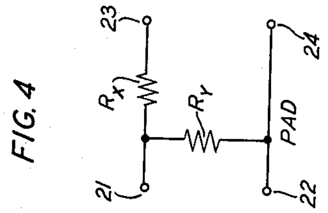
Fig. 4 is a schematic circuit of a resistive pad suitable for use as the networks such as PA1 and PB1 in Fig. 1.

Fig. 4 shows an L-type resistive pad suitable for use as the impedance-transforming networks PA2 and PB2 in the unit 2 of Fig. 1. The pad has a pair of terminals 21, 22 and a second pair of terminals 23, 24, with a series resistor $R_X$ connected between the terminals 21 and 23 and a shunt resistor $R_Y$ connected between the terminals 21 and 22. When used in the bridging branch, the pad is so connected that the resistor $R_Y$ shunts the resistor $R_{A2}$; that is, the terminals 21, 22 are connected, respectively, to the terminals 26, 27 of the resistor $R_{A2}$. When the pad is used in the shunt branch, however, the resistor $R_X$ is connected in series with the shunt resistor $R_{B2}$; that is, the terminal 23 of the pad is connected to the terminal 28 of the resistor $R_{B2}$ and the terminal 24 is connected to the grounded side of the equalizer. In this way, the bridging impedance $Z_{A2}$ is reduced and the shunt impedance $Z_{B2}$ is increased, thus reducing the flat loss of the unit 2. If, for example, the equalizer has 24 units, corresponding to 24 harmonically related cosine shapes, the first three units may have full range, the next three a range of $\pm1.5$ decibels, the next three a range of $\pm1.0$ decibel, and the remaining units a range of $\pm0.5$ decibel. In the case where the dissipation correctors are omitted and each terminating resistor has a range of 15 to 375 ohms, it has been found that, with no padding, the flat loss of a unit is 4.18 and the range 2.73 decibels. With pads of 2.26, 3.74, and 5.82 decibels, the corresponding ranges are 1.5, 1.0, and 0.5 decibels, and the flat losses are 3.82, 3.30, and 2.21 decibels, respectively. It is apparent that a considerable amount of flat loss is saved by using the pads where permissible.

Figure 6:
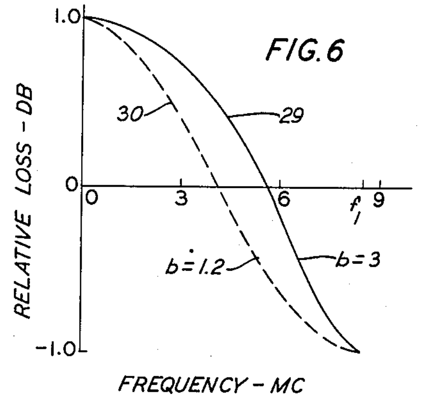
Fig. 6 shows the loss-frequency characteristic of a warped cosine equalizer unit in accordance with the invention and, for comparison, a true cosine characteristic.

In Fig. 6, the solid-line curve 29 shows a typical maximum loss characteristic obtainable with the unit 1 of an equalizer in accordance with the invention. The departure of the insertion loss from the flat loss is plotted on a unit basis against the operating frequency range extending from zero to $f_1$, which is 8.35 megacycles. The shaping network SA1 employed has the upward-sloping phase characteristic shown in Fig. 7, with the parameter $b$ equal to three. The curve 29 is obtained with the resistor $k_1$R set at its maximum value and the resistor $R/k_1$ set at its corresponding minimum value. It will be understood, of course, that the curve may be inverted, so that it rises from $-1.0$ at zero frequency to $+1.0$ at $f_1$, by adjusting $k_1$R to minimum and $R/k_1$ to maximum. Also, an infinite family of intermediate characteristics may be obtained by setting the terminating resistors at the proper intermediate values. For comparison, the broken-line curve 30 shows the cosine characteristic corresponding to a shaping network having a phase shift which is linear with frequency. It is seen that the characteristic 29 is not a true cosine curve, but is warped with frequency.

The other units of the equalizer may be designed to provide warped cosine shapes of higher order. For example, if the shaping network SA2 in the unit 2 of Fig. 1 has a phase characteristic double that of the network SA1 in the unit 1, the unit 2 will furnish a warped second harmonic cosine shape. As already mentioned, the network SA2 may consist of two units identical with the network SA1 connected in tandem. Likewise, the unit N will provide the Nth harmonic if the shaping network SAN consists of the tandem combination of N networks identical with SA1. Since the shaping network such as SBN in the shunt impedance $Z_{BN}$ of each unit may be identical with the corresponding network SAN in the bridging branch, it is seen that all of the shaping networks used in the entire composite equalizer may be constructed of identical shaping networks. Also, the adjustable dual terminating resistors used in all of the units may be identical. This contributes greatly to reducing the design effort required and decreasing the cost of the equalizer.

Figure 9:
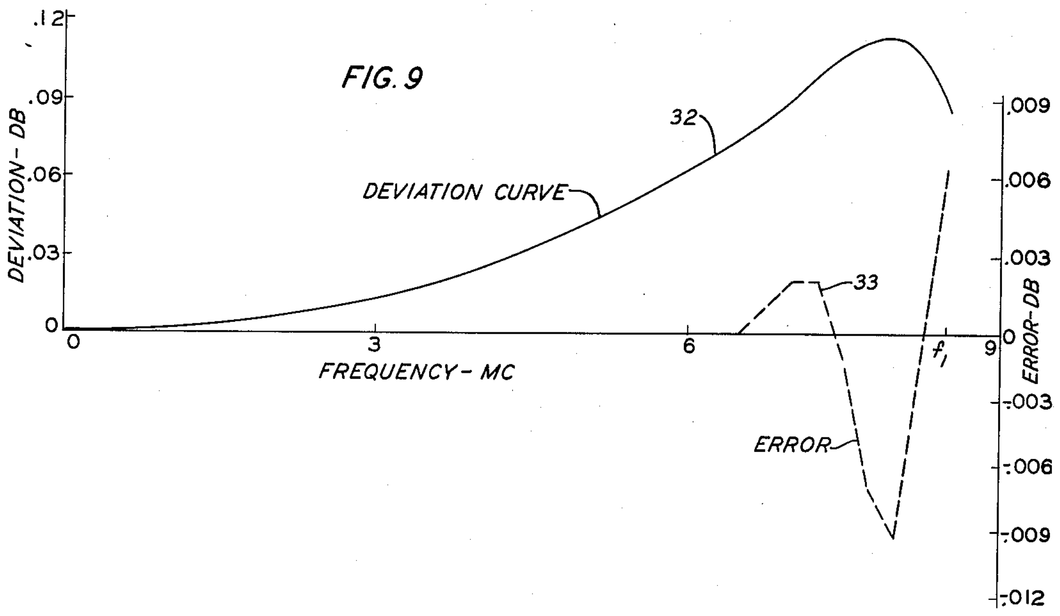
Fig. 9 shows in solid line a typical distortion characteristic to be equalized and in broken line, to an enlarged scale, the error characteristic obtained with the equalizer of Fig. 1.

Fig. 9 shows the simulation obtainable with an adjustable equalizer of the type just described comprising ten harmonically related cosine shapes and a level-adjusting unit. The solid-line curve 32 shows the deviation characteristic to be matched. The deviation, in decibels, is read on the ordinate scale to the left. The broken-line curve 33 shows the error of the match to the much enlarged ordinate scale at the right. Below six megacycles, the error is too small to show on the scale used. Above this frequency, the maximum error is less than 0.01 decibel, at the point where the deviation curve has a magnitude of approximately 0.12 decibel. The error could be reduced by adding more equalizer units, without redesigning the present units in any way.

It is to be understood that the above-described arrangement is illustrative of the application of the principles of the invention. Numerous other arrangements may be devised by those skilled in the art without departing from the spirit and scope of the invention.

What is claimed is:

1. An equalizer comprising a plurality of bridged-T units connected in tandem, each of said units comprising two series-connected resistors each of value R, an interposed shunt impedance branch of impedance $Z_B$, and a bridging impedance branch of impedance $Z_A$, said bridging branch comprising a third resistor connected to the outer terminals of said series resistors and a first shaping network connected at one end in shunt with said third resistor and terminated at its other end in a fourth variable resistor of value $k$R, said shunt branch comprising a fifth resistor connected at one end to the common terminal of said series resistors and a second shaping network connected at one end in series with said fifth resistor and terminated at its other end in a sixth variable resistor of value $R/k$, each of said shaping networks having an image impedance approximately equal to R, negligible attenuation, and a phase shift which varies non-linearly from zero to $90n$ degrees over the operating frequency range and the phase characteristics of all of said shaping networks being similarly shaped, where $k$ is a numerical constant, $n$ is an integer corresponding to the number of the unit, the resistance of said third resistor is approximately equal to 1.62R, and the product $Z_AZ_B$ is approximately equal to $R^2$.

2. An equalizer in accordance with claim 1 in which each of said shaping networks has a phase-frequency characteristic which curves upward over said operating range.

3. An equalizer in accordance with claim 1 in which each of said shaping networks has a phase-frequency characteristic which curves downward over said operating range.

4. An equalizer in accordance with claim 1 in which one of said units includes an impedance transformer connected between said first shaping network and said third resistor to decrease the impedance $Z_A$ by a constant factor and a second impedance transformer connected between said second shaping network and said fifth resistor to increase the impedance $Z_B$ by the same factor.

5. An equalizer in accordance with claim 4 in which said one unit includes a network in the bridging branch to correct for the dissipation in said first shaping network and another network in the shunt branch to correct for the dissipation in said second shaping network.

6. An equalizer in accordance with claim 4 in which each of said impedance transformers is a resistive pad.

7. An equalizer in accordance with claim 6 in which said resistive pads are of the L type.

8. An equalizer in accordance with claim 1 in which one of said units includes a network in the bridging branch to correct for the dissipation in said first shaping network and another network in the shunt branch to correct for the dissipation in said second shaping network.

9. An equalizer in accordance with claim 8 in which each of said dissipation-correcting networks has an image impedance approximately equal to R.

10. An equalizer in accordance with claim 9 in which each of said dissipation-correcting networks is a bridged-T structure.

11. An equalizer in accordance with claim 1 in which each of said shaping networks comprises $n$ subsidiary networks connected in tandem, all of said subsidiary networks being substantially identical.

12. An equalizer in accordance with claim 1 in wihch each of said shaping networks comprises $n$ bridged-T structures connected in tandem, each of said structures comprising two equal inductors connected in series, an interposed shunt capacitor, and a bridging capacitor connected to the outer terminals of said inductors.

13. An equalizer in accordance with claim 12 in which each of said inductors has an inductance approximately equal to $R/2\pi f_c$, said bridging capacitor has a capacitance approximately equal to $1/4\pi f_c R$, and said shunt capacitor has a capacitance approximately equal to four times the capacitance of said bridging capacitor, where $f_c$ is the frequency at which the phase shift in each of said bridged-T structures is 180 degrees.

14. An equalizer of the bridged-T type comprising two series-connected resistors each of value R, an interposed shunt impedance branch, and a bridging impedance branch, said bridging branch comprising a third resistor of value $R_A$ connected to the outer terminals of said series resistors and a first shaping network connected at one end in shunt with said third resistor and terminated at its other end in a fourth variable resistor of value $k$R, and said shunt branch comprising a fifth resistor of value $R_B$ connected at one end to the common terminal of said series resistors and a second shaping network connected at one end in series with said fifth resistor and terminated at its other end in a sixth variable resistor of value $R/k$, each of said shaping networks having an image impedance approximately equal to R, negligible attenuation, and a phase shift which varies non-linearly from zero to an integral multiple of 90 degrees over the operating frequency range, where $k$ is a numerical constant, $R_A$ is approximately equal to 1.62R, and $R_B$ is approximately equal to $R^2/R_A$.

15. An equalizer in accordance with claim 14 in which each of said shaping networks has a phase-frequency characteristic which curves upward over said operating range.

16. An equalizer in accordance with claim 14 in which each of said shaping networks has a phase-frequency characteristic which curves downward over said operating range.

17. An equalizer in accordance with claim 14 which includes two impedance-transforming resistive pads, one of said pads being connected to said bridging branch to decrease the impedance thereof by a constant factor and the other of said pads being connected to said shunt branch to increase the impedance theerof by the same factor.

18. An equalizer in accordance with claim 14 in which each of said impedance branches includes a network adapted to correct for the dissipation in the associated shaping network.

19. An equalizer in accordance with claim 14 in which said shaping networks are substantially identical.

20. An equalizer in accordance with claim 14 in which each of said shaping networks includes a bridged-T structure comprising two equal inductors connected in series, an interposed shunt capacitor, and a bridging capacitor connected to the outer terminals of said inductors.

21. An equalizer in accordance with claim 20 in which each of said inductors has an inductance approximately equal to $R/2\pi f_c$, said bridging capacitor has a capacitance approximately equal to $1/4\pi f_c R$, and said shunt capacitor has a capacitance approximately equal to four itmes the capacitance of said bridging capacitor, where $f_c$ is the frequency at which the phase shift in each of said bridged-T structures is 180 degrees.

22. In combination, a plurality of equalizer units in accordance with claim 14 connected in tandem, all of the component shaping networks therein having similar phase characteristics each of which varies non-linearly from zero to $90n$ degrees over said operating frequency range, where $n$ is an integer corresponding to the number of the unit.

References Cited in the file of this patent

UNITED STATES PATENTS

| | | |
|---|---|---|
| 2,096,027 | Bode | Oct. 19, 1937 |
| 2,153,743 | Darlington | Apr. 11, 1939 |
| 2,348,572 | Richardson | May 9, 1944 |
| 2,374,872 | Lundry | May 1, 1945 |